(12) United States Patent
Seki et al.

(10) Patent No.: US 6,919,979 B2
(45) Date of Patent: Jul. 19, 2005

(54) OPTICAL SCANNING APPARATUS

(75) Inventors: Yuichi Seki, Saitama (JP); Katsuhide Koga, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 10/622,649

(22) Filed: Jul. 21, 2003

(65) Prior Publication Data

US 2004/0017598 A1 Jan. 29, 2004

(30) Foreign Application Priority Data

Jul. 25, 2002 (JP) ........................................ 2002/216631
Feb. 26, 2003 (JP) ........................................ 2003/049210

(51) Int. Cl.$^7$ ............................................. G02B 26/08
(52) U.S. Cl. ........................................ 359/204; 347/233
(58) Field of Search ................... 359/204; 250/234–236, 250/216, 578.1; 347/233–236; 358/474, 483

(56) References Cited

U.S. PATENT DOCUMENTS

| | | | |
|---|---|---|---|
| 5,786,594 A | 7/1998 | Ito et al. ...................... | 250/236 |
| 6,154,292 A | * 11/2000 | Motoi ........................ | 358/474 |
| 6,496,212 B1 | 12/2002 | Tanimoto et al. ........... | 347/234 |

FOREIGN PATENT DOCUMENTS

| | | |
|---|---|---|
| JP | 10-90615 | 4/1998 |
| JP | 10-90616 | 4/1998 |
| JP | 2000-180745 | 6/2000 |

* cited by examiner

*Primary Examiner*—James Phan
(74) *Attorney, Agent, or Firm*—Fitzpatrick, Cella, Harper & Scinto (57) ABSTRACT

An optical scanning apparatus which has a scanning position detecting section in which a plurality of light receiving sensors are arranged at predetermined spaces in a direction substantially perpendicular to the scanning direction without being overlapped in the scanning direction and each of the light receiving sensors has a shape in which a side into which scanning light of a laser beam is entered is substantially perpendicular to the scanning direction, an opposite side is slanted with respect to the scanning light, and at least one of recess is provided to the slanted side, and it is detected that pulse widths of respective output signals obtained by scanning the scanning position detecting sensor composed of the light receiving sensors with the scanning light of the laser beams are smaller than a predetermined pulse width, so that the resolution in the sub scanning direction of the lasers can be easily adjusted with a simple algorithm.

17 Claims, 10 Drawing Sheets

FIG. 7B c<b<a, e≧SPOT DIAMETER

LASER SPOT

OPTICAL SCANNING APPARATUS

BACKGROUND OF THE INVENTION

1. Field of the Invention

The present invention relates to an optical scanning apparatus in which a photosensitive member is scanned with a plurality of laser beams modulated according to an image signal to form a latent image. In particular, the present invention relates to an optical scanning apparatus for controlling a sub scanning pitch of a plurality of semiconductor lasers, and an image forming apparatus using the optical scanning apparatus.

2. Related Background Art

In an optical scanning apparatus in which a laser beam emitted by a laser beam driving circuit of a semiconductor laser is modulated according to an image signal and a photosensitive drum is scanned with the laser beam by a scanner motor for raster scanning to form a latent image, it is necessary to provide a plurality of single beam semiconductor lasers or a plurality of multi-beam semiconductor lasers. In addition, in the case of a system composed of the multi-beam semiconductor lasers, it is necessary to detect scanning positions of the respective laser beams such that a pitch in the sub scanning direction becomes predetermined spaces.

On the other hand, there is a method in which a plurality of light receiving sensors are arranged on an axis substantially perpendicular to the scanning direction at predetermined spaces, and it is judged that the spaces between the laser beams become the predetermined spaces through the fact that each of a plurality of laser beams passes through a corresponding light receiving sensor (for example, JP 2000-180745 A, JP 10-090615 A, and JP 10-090616 A).

However, in the above-mentioned conventional example, high precision mounting is required for positioning the plurality of light receiving sensors. In particular, variations in the direction substantially perpendicular to the scanning direction may cause the cases where laser beams cannot be detected. In addition, time lengths or voltage values of signals outputted from the light receiving sensors are measured and scanning positions are calculated from differential values thereof. Accordingly, it is difficult to detect slight changes in the scanning positions between the plurality of laser beams.

SUMMARY OF THE INVENTION

A primary object of the present invention is to provide an optical scanning apparatus in which resolution in a sub scanning direction of a plurality of lasers can easily be adjusted with a simple algorithm.

In order to achieve the above-mentioned object, according to a first aspect of the present invention, there is provided an optical scanning apparatus which has a scanning position detecting section in which a plurality of light receiving sensors are arranged at predetermined spaces in a direction substantially perpendicular to the scanning direction without being overlapped with the scanning direction, and each of the light receiving sensors has a shape in which one side into which scanning light of a laser beam is entered is substantially perpendicular to the scanning direction, an opposite side is slanted with respect to the scanning light, and at least one of recess is provided to the slanted side, and it is detected that pulse widths of respective output signals obtained by scanning a scanning position detecting sensor composed of the plurality of light receiving sensors with the scanning light of the plurality of laser beams are smaller than a predetermined pulse width, whereby resolution in a sub scanning direction of the plurality of lasers can easily be adjusted with a simple algorithm.

The above and other objects, features, and advantages of the invention will become more apparent from the following detailed description taken in conjunction with the accompanying drawings.

DESCRIPTION OF THE PREFERRED EMBODIMENTS

The present invention will now be described in detail below with reference to the accompanying drawings showing a preferred embodiment thereof. In the drawings, elements and parts which are identical throughout the views are designated by identical reference numeral, and duplicate description thereof is omitted.

Figure 1:
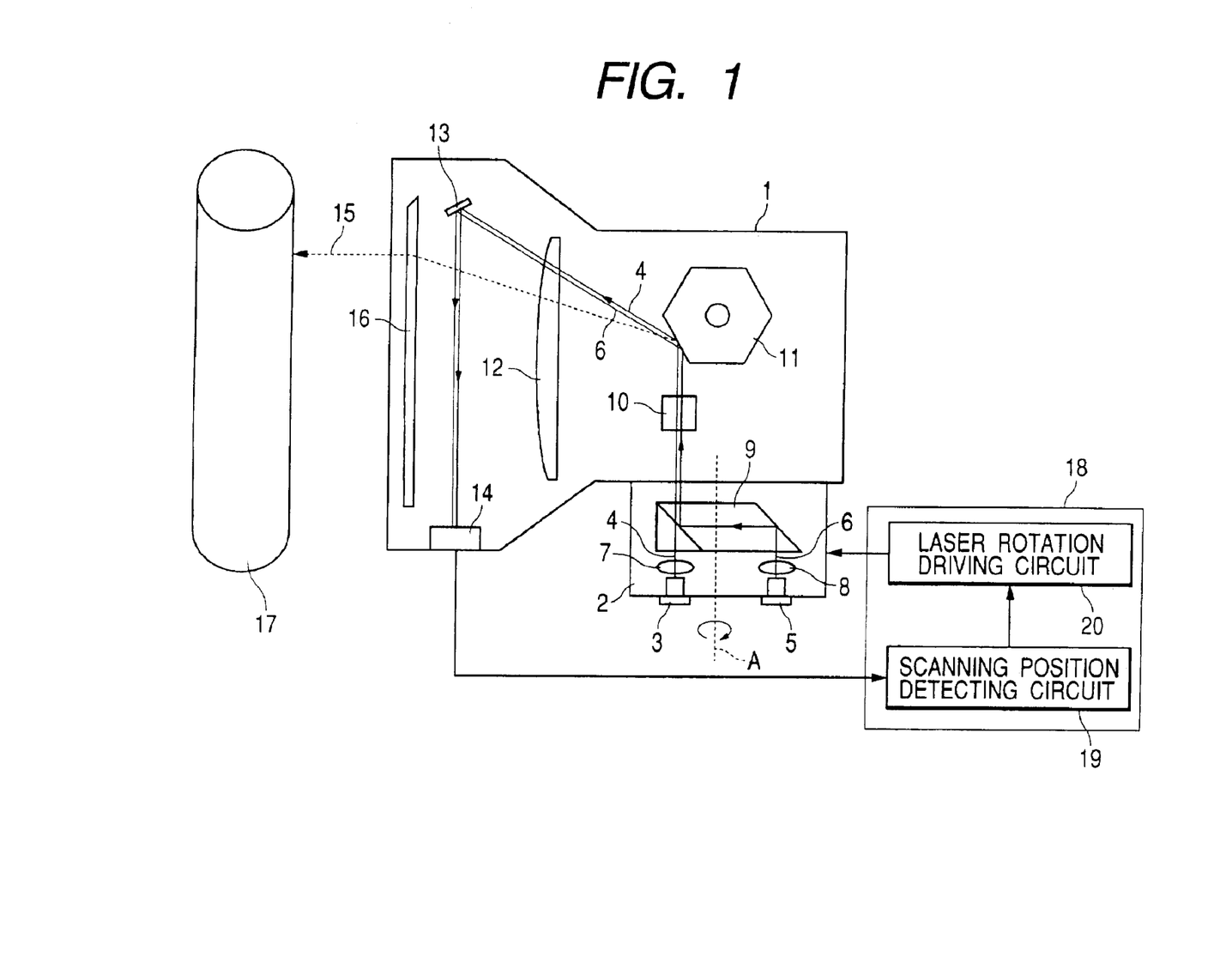
FIG. 1 shows a structure of an optical scanning apparatus according to the present invention.

FIG. 1 is a partial block diagram showing a structure of an optical scanning apparatus according to the present invention. An optical scanning unit 1 includes a semiconductor laser 3 and a semiconductor laser 5. A laser synthesizing unit 2 is composed of the semiconductor laser 3, the semiconductor laser 5, a collimator lens 7, a collimator lens 8, a prism 9, and a unit rotation driving section (not shown). A rotational axis "A" of the rotation driving section is in parallel to the optical axis of the semiconductor laser 3 and the optical axis the semiconductor laser 5 and located in a central region.

In a non-image region, a laser beam 4 emitted from the semiconductor laser 3 is entered into a cylindrical lens 10 through the collimator lens 7 and the prism 9 and reaches a polygon mirror 11. The polygon mirror 11 is rotated at a constant angular rate by a scanner motor which is not shown. The laser beam 4 which has reached the polygon mirror 11 is deflected by the polygon mirror 11. The deflected laser beam is converted by an f-θ lens 12 such that it becomes uniform scanning in a direction perpendicular to the rotational direction of a photosensitive drum 17, the beam is reflected on a reflecting mirror 13, and is received in a scanning position detecting sensor 14. In an image region, after a laser beam 15 passes through the f-θ lens 12 as in the case of the laser beam 4, a photosensitive drum 17 is irradiated with the laser beam 15 through a reflecting mirror 16.

On the other hand, a laser beam 6 emitted from the semiconductor laser 5 is entered into the prism 9 through the collimator lens 8. The laser beam 6 deflected by the prism 9 is synthesized with the laser beam 4 at preset beam spaces. In the non-image region, the laser beam 6 is entered into the cylindrical lens 10 and is deflected by the polygon mirror 11. The deflected laser beam 6 is entered into the f-θ lens 12 and is received in the scanning position detecting sensor 14 by the reflecting mirror 13. In the image region, the laser beam 6 travels as in the case of the semiconductor laser 3. Therefore, the description is omitted here.

An output of the scanning position detecting sensor 14 is sent to a beam pitch control section 18. The beam pitch control section 18 includes a scanning position detecting circuit 19 and a laser rotation driving circuit 20. The laser rotation driving circuit 20 controls the unit rotation driving section (not shown) based on an output of the scanning position detecting circuit 19.

(First Embodiment)

Figure 2:
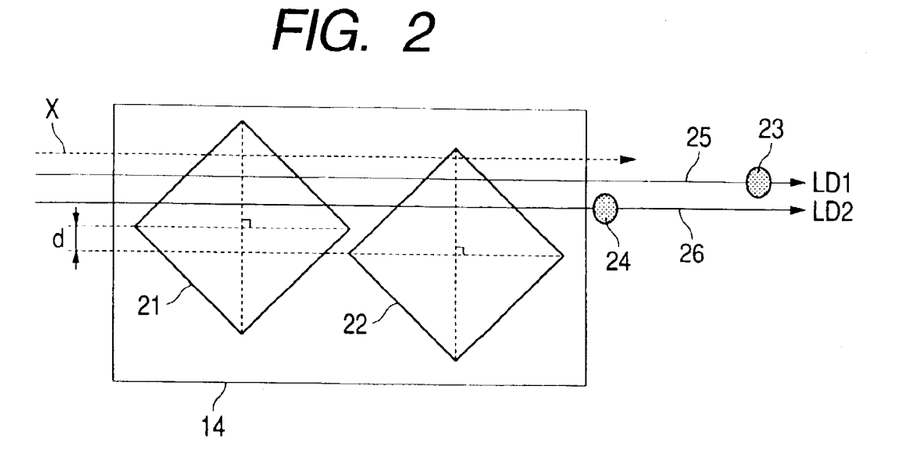
FIG. 2 is a structural view showing a structure of a scanning position detecting sensor according to a first embodiment.

FIG. 2 is a structural view showing a structure of a scanning position detecting sensor according to the present invention. Hereinafter, the case where the scanning position detecting sensor 14 is scanned with two laser beams will be described as an example. The scanning position detecting sensor 14 is composed of two photo sensors having the same shape, that is, a photo sensor 21 and a photo sensor 22. In order not to overlap with a scanning direction X of two laser beams (LD1 and LD2), the photo sensor 21 and the photo sensor 22 are arranged at a space d in a direction substantially perpendicular to the scanning direction X. Here, the photo sensor 21 and the photo sensor 22 are of a congruent shape, that is, a shape in which both photo sensors completely coincide with each other when they are overlapped with each other. Therefore, a scanning position detecting section including the plurality of light receiving sensors is provided. Here, the light receiving sensors have the same shape, the same size, and the same orientation. The number of the light receiving sensors is equal to or larger than the number of beams. The light receiving sensors are arranged at predetermined spaces in the direction substantially perpendicular to the scanning direction X without being overlapped in the scanning direction X. A shape of the respective light receiving sensors is made to a polygon axisymmetric with respect to an axis parallel to the scanning direction X or an axis substantially perpendicular to the scanning direction X. This is also to provide the following scanning position detecting section. That is, the plurality of light receiving sensors are arranged at the predetermined spaces in the sub scanning direction without being overlapped with each other. With respect to the shape of the respective light receiving sensors, the edges thereof in a main scanning direction start side are in parallel to each other, the edges thereof in a main scanning direction end side are in parallel to each other, and the edge in the main scanning direction start side and the edge in the main scanning direction end side are not parallel to each other.

Here, assume that a space d between the photo sensor 21 and the photo sensor 22 is equivalent to 600 dpi (42.23 µm). The photo sensor 21 is selected so as to receive only a light output from a spot 23 irradiated with the laser beam 1 (LD1) and the photo sensor 22 is selected so as to receive only a light output from a spot 24 irradiated with the laser beam 2 (LD2). In the case where a scanning space between a scanning line 25 of the laser beam LD1 and a scanning line 26 of the laser beam LD2 is d, when the scanning position detecting sensor is constructed as described above, the length that the scanning line 25 of LD1 scans on the photo sensor 21 becomes equal to the length that the scanning line 26 of LD2 scans on the photo sensor 22.

(Second Embodiment)

Figure 3:
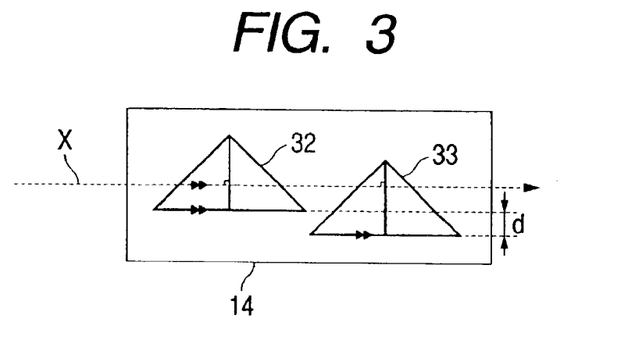
FIG. 3 is a structural view showing a structure of a scanning position detecting sensor according to a second embodiment.

FIG. 3 is a structural view showing a structure of a scanning position detecting sensor according to a second embodiment of the present invention. A scanning position detecting sensor 14 is composed of a photo sensor 32 and a photo sensor 33 which are a triangle axisymmetric with respect to an axis substantially perpendicular to the scanning direction of a laser beam and have the same shape and the same size as in the case of the first embodiment. Those photo sensors are arranged at positions at a space of d in a direction substantially perpendicular to a scanning direction X.

The space d is set equal to 600 dpi (42.23 µm). The photo sensor 32 is selected so as to receive only a light output from a spot irradiated with a laser beam 1 (LD1) and the photo sensor 32 is selected so as to receive only a light output from a spot irradiated with a laser beam 2 (LD2). Here, in the case where a scanning space between a scanning line of the laser beam LD1 and a scanning line of the laser beam LD2 is d, when the scanning position detecting sensor is constructed as described above, the length that the scanning line of LD1 scans on the photo sensor 32 becomes equal to the length that the scanning line of LD2 scans on the photo sensor 33.

(Third Embodiment)

Figure 4:
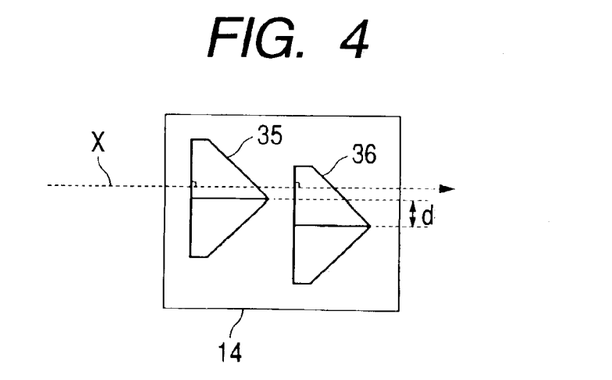
FIG. 4 is a structural view showing a structure of a scanning position detecting sensor according to a third embodiment.

FIG. 4 is a structural view showing a structure of a scanning position detecting sensor according to a third embodiment of the present invention. A scanning position detecting sensor 14 is composed of a photo sensor 35 and a photo sensor 36 which are a pentagon axisymmetric with respect to an axis parallel to the scanning direction of a laser beam and have the same shape and the same size. Symmetric axes of the respective sensors are arranged at positions at a space of d in a direction substantially perpendicular to a scanning direction X.

The space d is set equal to 600 dpi (42.23 µm). The photo sensor 35 is selected so as to receive only a light output from a spot irradiated with a laser beam 1 (LD1) and the photo sensor 36 is selected so as to receive only a light output from a spot irradiated with a laser beam 2 (LD2). Here, in the case where a scanning space between a scanning line of the laser beam LD1 and a scanning line of the laser beam LD2 is d, when the scanning position detecting sensor is constructed as described above, the length that the scanning line of LD1 scans on the photo sensor 35 becomes equal to the length that the scanning line of LD2 scans on the photo sensor 36.

(Fourth Embodiment)

Figure 5:
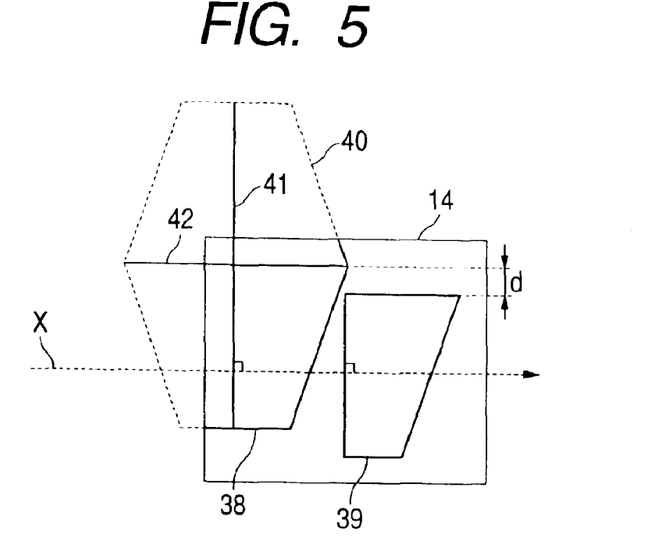
FIG. 5 is a structural view showing a structure of a scanning position detecting sensor according to a fourth embodiment.

FIG. 5 is a structural view showing a structure of a scanning position detecting sensor according to a fourth embodiment of the present invention. A scanning position detecting sensor 14 is composed of a photo sensor 38 and a photo sensor 39. The photo sensor 38 is formed by dividing a photo sensor 40 with an original shape of a photo sensor axisymmetric with respect to a scanning direction X by a symmetric axis 41 and a symmetric axis 42 thereof. The photo sensor 39 has the same shape and the same size as those of the photo sensor 38 and symmetric axes thereof are arranged at positions at a space of d in a direction substantially perpendicular to a scanning direction.

The space d is set equal to 600 dpi (42.23 μm). The photo sensor 38 is selected so as to receive only a light output from a spot irradiated with a laser beam 1 (LD1) and the photo sensor 39 is selected so as to receive only a light output from a spot irradiated with a laser beam 2 (LD2). Here, in the case where a scanning space between a scanning line of the laser beam LD1 and a scanning line of the laser beam LD2 is d, when the scanning position detecting sensor is constructed as described above, the length that the scanning line of LD1 scans on the photo sensor 38 becomes equal to the length that the scanning line of LD2 scans on the photo sensor 39.

(Fifth Embodiment)

Figure 6A:
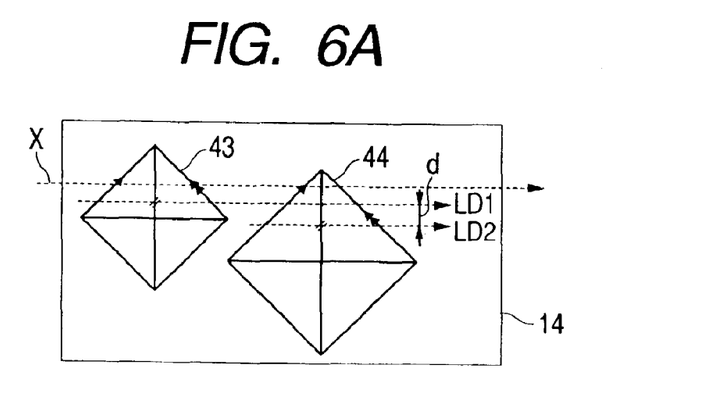
FIGS. 6A and 6B are structural views showing structures of scanning position detecting sensors according to a fifth embodiment.
Figure 6B:
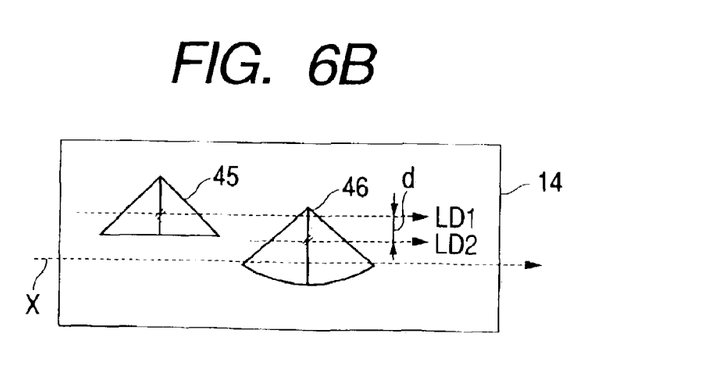

The photo sensors described in the first to fourth embodiments are of a congruent shape, that is, a shape in which the photo sensors in each of the embodiments completely coincide with each other when they are overlapped with each other. Because of the congruent shape, with respect to a shape of respective light receiving portions, the edges thereof in a main scanning direction start side are in parallel to each other and the edges thereof in a main scanning direction end side are in parallel to each other. However, the shape is not limited to a congruent shape as in the case of a set of photo sensors 43 and 44 or a set of photo sensors 45 and 46 as shown in FIGS. 6A and 6B, respectively. The set of photo sensors are shifted from each other by the predetermined spaces in a direction substantially perpendicular to a scanning direction X without being overlapped with each other, the edges thereof in a main scanning direction start side are in parallel to each other, the edges thereof in a main scanning direction end side are in parallel to each other, and the edge in the main scanning direction start side and the edge in the main scanning direction end side are not parallel to each other. Here, in the case where the set of the photo sensors are arranged in positions at a space of d and a scanning space of laser beams is d, when the scanning position detecting sensor is constructed as described above, the lengths that the respective scanning lines scan on the respective photo sensors become equal to one another.

(Sixth Embodiment)

Figure 7A:
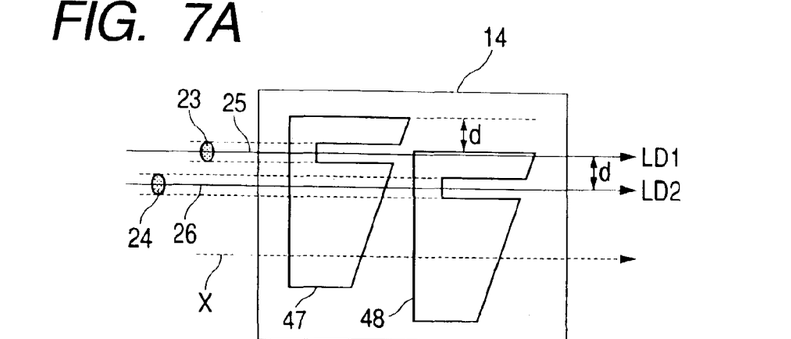
FIGS. 7A, 7B and 7C are structural views showing structures of scanning position detecting sensors according to a sixth embodiment.
Figure 7B:
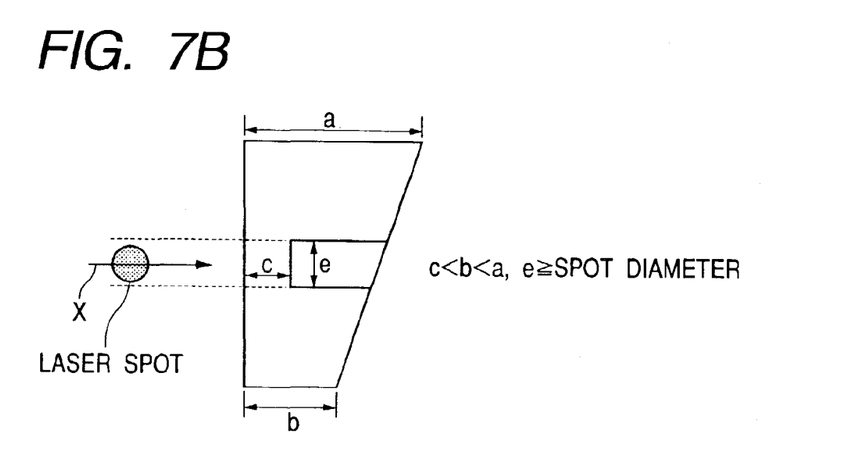
Figure 7C:
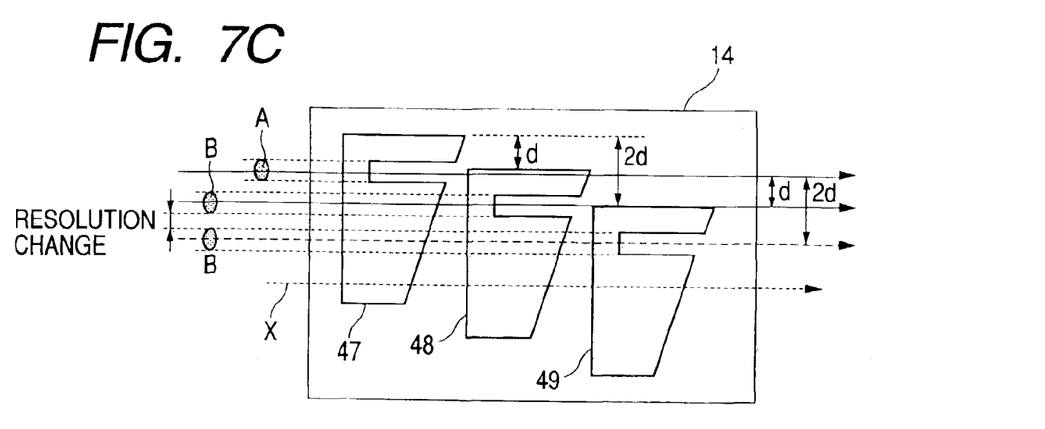

FIGS. 7A, 7B, and 7C each show a scanning position detecting sensor composed of two photo sensors having the same shape, that is, a photo sensor 47 and a photo sensor 48. The photo sensor 47 and the photo sensor 48 are arranged at a space of d in a direction substantially perpendicular to a scanning direction X so as not to overlap with the scanning direction X of two laser beams (LD1 and LD2). With respect to a shape of the respective photo sensors, as shown in FIG. 7B, when a length of a maximum side in a direction parallel to the scanning direction is given by "a", a length of a minimum side therein is given by "b", and a length from the side substantially perpendicular to the scanning direction to the bottom of the recess is given by "c", the relationship of $c<b<a$ is obtained. The photo sensor 47 is selected so as to receive only a light output from a spot 23 irradiated with a laser beam 25 (LD1) and the photo sensor 48 is selected so as to receive only a light output from a spot 24 irradiated with a laser beam 26 (LD2).

When the space d between the photo sensor 47 and the photo sensor 48 is equal to 600 dpi (42.23 μm), a space between the center line of the recess of the photo sensor 47 and the center line of the recess of the photo sensor 48 is also d. Therefore, when it is controlled such that a scanning line 25 of LD1 passes through the recess portion of the photo sensor 47 and a scanning line 26 of LD2 passes through the recess portion of the photo sensor 48, a scanning space becomes 600 dpi.

Further, as shown in FIG. 7C, in the case of a scanning position detecting section 14 composed of three photo sensors, in which a photo sensor 49 is located at a position apart from the photo sensor 47 by 2×d, when it is controlled such that the laser beam 26 (LD2) is shifted by resolution conversion to pass the beam through the recess portion of the photo sensor 49, a scanning space becomes 300 dpi.

Note that the example of the photo sensor in which the length of the minimum side is given by "b" is described above. However, a photo sensor having a shape of b=0 may be used. In such a sensor, a relationship of $c<a$ is satisfied. In addition, each of the light receiving portions has a shape in which one edge in a main scanning direction start side is substantially perpendicular to the main scanning direction and a recess is provided to the other edge in a main scanning direction end side. However, a reverse structure may be used. In other words, it is a shape in which one edge in the main scanning direction end side is substantially perpendicular to the main scanning direction and the recess is provided to the other edge in the main scanning direction start side.

(Seventh Embodiment)

Figure 8:
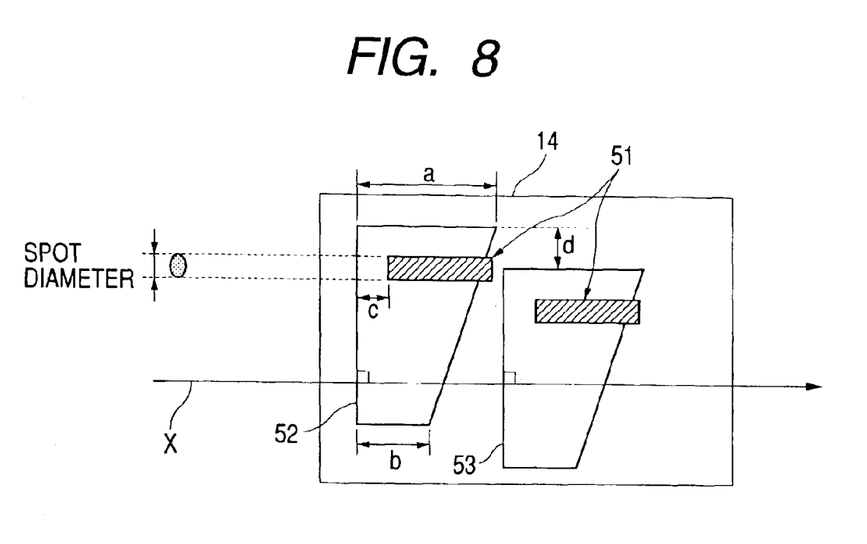
FIG. 8 is a structural view showing a structure of a scanning position detecting sensor according to a seventh embodiment.

FIG. 8 shows another structure of a scanning position detecting sensor according to the present invention. A scanning position detecting sensor 14 is composed of a photo sensor 52 and a photo sensor 53, which are pentagons. The recess portions are formed by mask processing using members 51 (hatched regions) which do not reflect light. Thus, light traveling to the mask regions is not entered into the sensors, so that the same effect as that of the embodiment shown in FIG. 7A is obtained.

(Eighth Embodiment)

Figure 9:
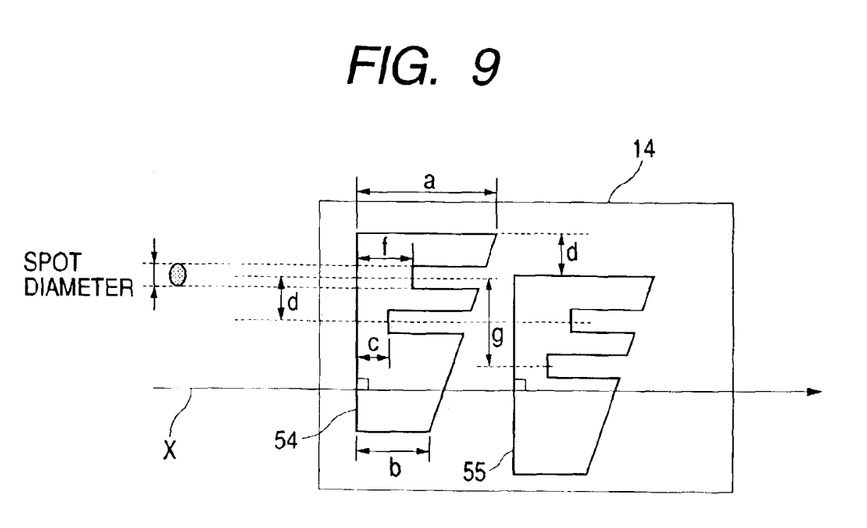
FIG. 9 is a structural view showing a structure of a scanning position detecting sensor according to a eighth embodiment.

FIG. 9 shows still another structure of a scanning position detecting sensor according to the present invention. A scanning position detecting sensor 14 is composed of a photo sensor 54 and a photo sensor 55. Each of the photo sensors has two recesses. Lengths from the side substantially perpendicular to the scanning direction to the bottoms of the respective recesses are different from each other. When a length of a maximum side in a direction parallel to the scanning direction is given by "a", a length of a minimum side therein is given by "b", lengths from the side substantially perpendicular to the scanning direction to the bottoms of the recesses are given by "c" and "f" (c<f), the relationship of $c<f<b<a$ is obtained. Further, a space between the center lines of the two recesses is d (for example, 600 dpi). Therefore, when it is controlled such that the scanning line of LD1 passes through the recess f-side portion of the photo sensor 54 and the scanning line of LD2 passes through the recess f-side portion of the photo sensor 55, a scanning space becomes 600 dpi. Similarly, when it is controlled such that the scanning line of LD1 passes through the recess f-side portion of the photo sensor 54 and the scanning line of LD2 passes through the recess c-side portion of the photo sensor 55, a scanning space becomes 300 dpi. Thus, the number of photo sensors smaller than that in the embodiment shown in FIG. 7C allows resolution conversion.

(Structure of Detecting Circuit and Algorithm)

Figure 10:
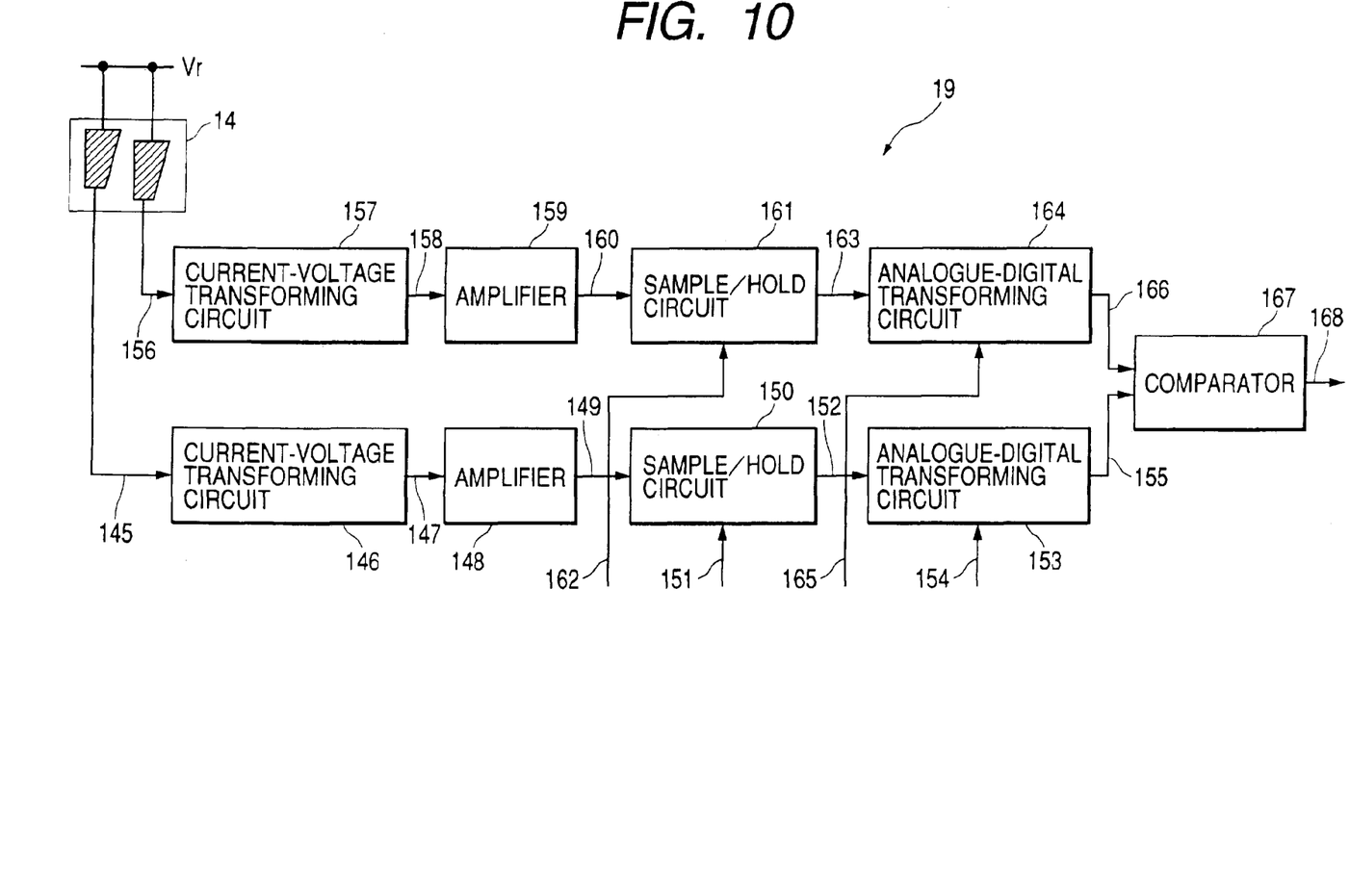
FIG. 10 is a block diagram showing a structure of a scanning position detecting circuit of the present invention.

FIG. 10 is a block diagram showing a structure of a scanning position detecting circuit 19 of the present invention. The case where the scanning position detecting sensor 14 according to the sixth embodiment is used will be described as an example. A photo sensor output current signal 145 from the scanning position detecting sensor 14 is converted to an output voltage signal 147 by a current-voltage transforming circuit 146. An amplifier 148 has an arbitrary gain, amplifies the output voltage signal 147, and inputs an output voltage signal 149 to a sample/hold circuit 150. The sample/hold circuit 150 samples the output voltage signal 149 in accordance with a sample/hold signal 151. The sample/hold signal 151 is a control signal which is generated by an external control circuit (not shown), used for obtaining a sample voltage signal 152 by sampling the output voltage signal 149 during a predetermined period in synchronization with the rise of the photo sensor output current signal 145, and used for holding the sample voltage signal 152 during a period except the predetermined period. In an analog-digital (A/D) transforming circuit 153, when an analog-digital (A/D) conversion control signal 154 is outputted thereto, the sample voltage signal 152 is subjected to digital conversion to obtain an output signal 155 of the analog-digital (A/D) transforming circuit 153.

A photo sensor output current signal 156 from the scanning position detecting sensor 14 is converted to an output voltage signal 158 by a current-voltage transforming circuit 157. An amplifier 159 has the same gain as that of the amplifier 148, amplifies the output voltage signal 158, and inputs an output voltage signal 160 to a sample/hold circuit 161. The sample/hold circuit 161 samples the output voltage signal 160 in accordance with a sample/hold signal 162. The sample/hold signal 162 is a control signal which is generated by an external control circuit (not shown), used for generating a sample voltage signal 163 using the same sampling period as in the case of the sample/hold signal 151 in synchronization with the rise of the photo sensor output current signal 156, and used for holding the sample voltage signal 163 during a period except the sampling period. In an analog-digital (A/D) transforming circuit 164, when an analog-digital (A/D) conversion control signal 165 is outputted thereto, the sample voltage signal 163 is subjected to digital conversion to obtain an output signal 166 of the analog-digital (A/D) transforming circuit 164.

The output signal 155 of the analog-digital (A/D) transforming circuit 153 and the output signal 166 of the analog-digital (A/D) transforming circuit 164 are inputted to a comparator 167. When both signals coincide with each other, a scanning position consistent signal 168 is outputted.

Figure 11:
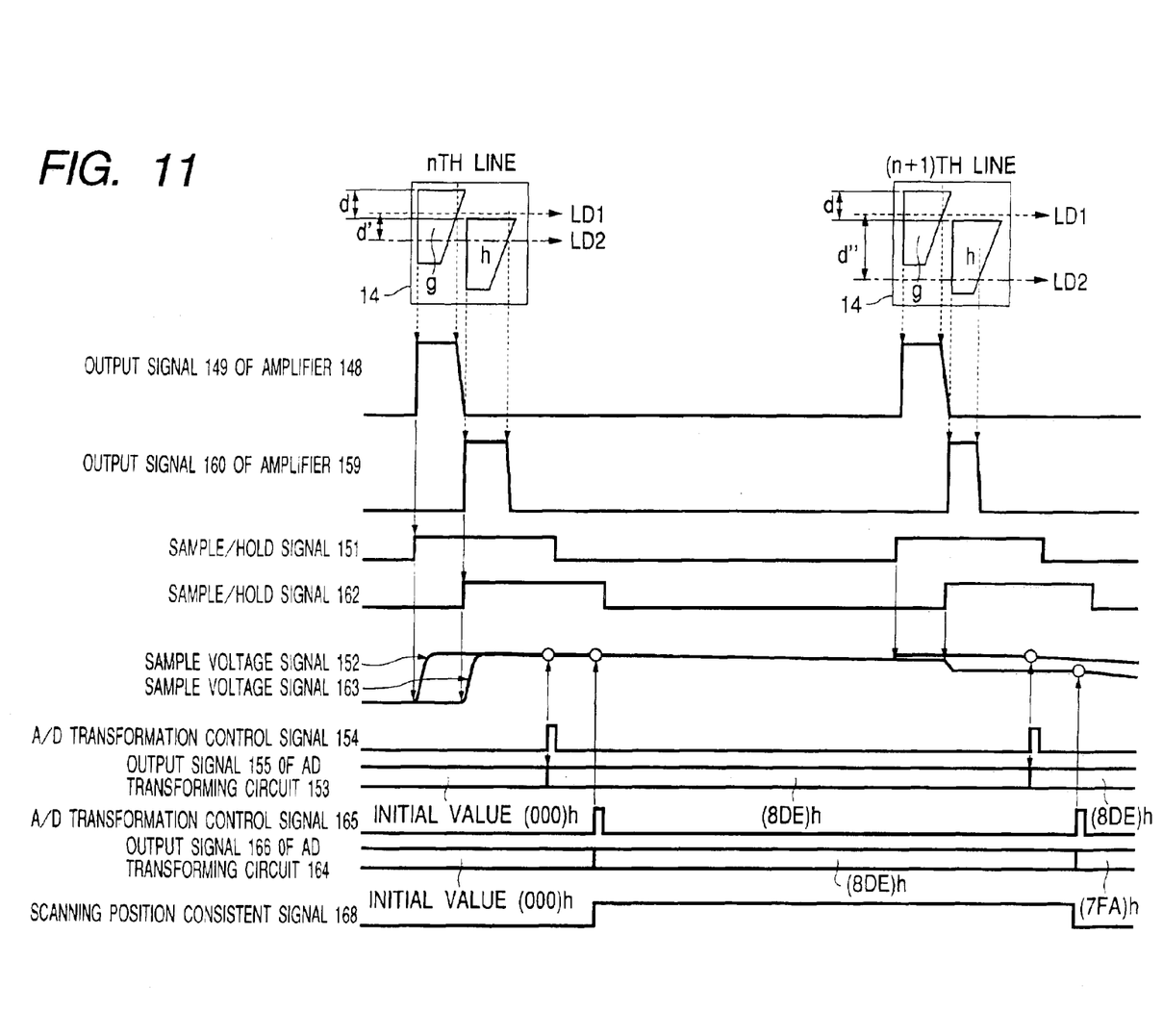
FIG. 11 is a timing chart showing output states of main blocks.

FIG. 11 is a timing chart showing output states of main blocks. Hereinafter, the case where a phase position detecting sensor 14 is scanned with two laser beams will be described as an example. In an nth scanning line, the output signal 149 of the amplifier 148 is a signal obtained by amplifying the photo sensor output current signal 145 outputted at a time when a photo sensor "g" on the phase position detecting sensor 14 is scanned with LD1. On the other hand, the output signal 160 of the amplifier 159 is a signal obtained by amplifying the photo sensor output current signal 156 outputted at a time when a photo sensor "h" on the phase position detecting sensor 14 is scanned with LD2. Now, when a space d' between the scanning line of LD1 and the scanning line of LD2 is equal to the space d between the photo sensor "g" and the photo sensor "h", a pulse width of the output signal 149 of the amplifier 148 is also equal to that of the output signal 160 of the amplifier 159. Further, the sample voltage signal 152 becomes equal to the sample voltage signal 163. A digital value of the output signal 155 of the A/D transforming circuit 153 which is obtained by conversion according to the A/D conversion control signal 154 coincides with a digital value of the output signal 166 of the A/D transforming circuit 164 which is obtained by conversion according to the A/D conversion control signal 165. As a result, the scanning position consistent signal 168 is outputted.

On the other hand, in an (n+1)th scanning line, when a space d" between the scanning line of LD1 and the scanning line of LD2 is larger than the space d between the photo sensor. "g" and the photo sensor "h", the pulse width of the output signal 160 of the amplifier 159 becomes narrower than that of the output signal 149 of the amplifier 148. As a result, the sample voltage signal 163 becomes smaller than the sample voltage signal 152. A digital value (7FA)h of the output signal 166 of the A/D transforming circuit 164 which is obtained by conversion according to the A/D conversion control signal 165 becomes smaller than a digital value (8DE)h of the output signal 155 of the A/D transforming circuit 153 which is obtained by conversion according to the A/D conversion control signal 154. Those output signals 155 and 166 are compared with each other by the comparator 167, and it is determined that the space d" between the scanning line of LD1 and the scanning line of LD2 does not coincide with the space d between the photo sensor "g" and the photo sensor "h". Thus, the scanning position consistent signal 168 is not outputted.

Figure 12:
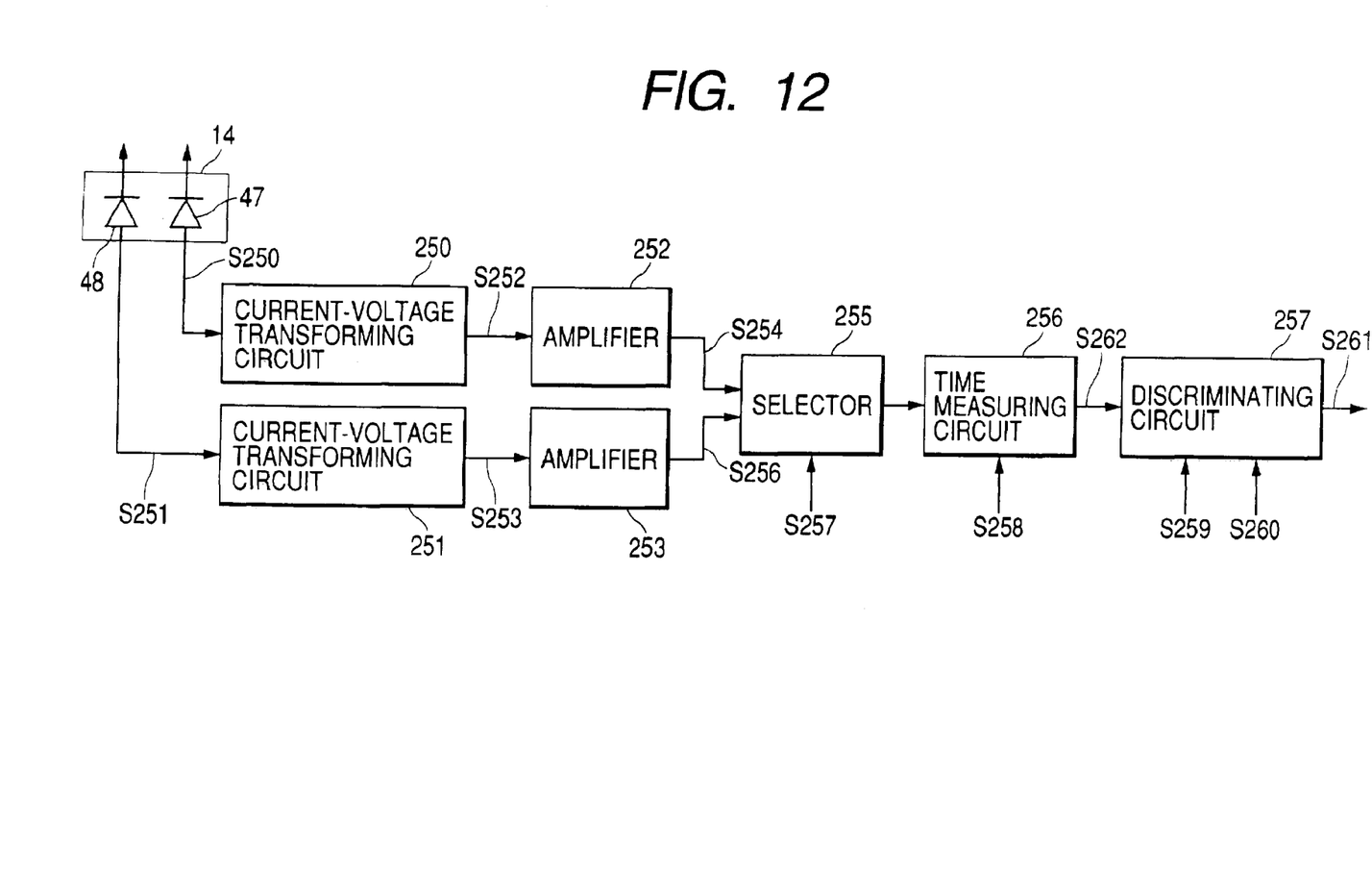
FIG. 12 is a block diagram showing another structure of a scanning position detecting circuit of the present invention.

FIG. 12 is a block diagram showing another structure of a scanning position detecting circuit of the present invention. The case where the scanning position detecting sensor 14 according to the embodiment shown in FIG. 7A is used will be described as an example. An output current signal S250 from the photo sensor 47 of the scanning position detecting sensor 14 is converted to an output voltage signal S252 by a current-voltage transforming circuit 250. An amplifier 252 has an arbitrary gain, amplifies the output voltage signal S252, and inputs an amplified signal S254 to a selector 255. On the other hand, an output current signal S251 from the photo sensor 48 is converted to an amplified signal S256 by similar circuits 251 and 253 and is then inputted to the selector 255. The selector 255 selects either the amplified signal S254 from the photo sensor 47 or the amplified signal S256 from the photo sensor 48 according to a mode of a mode signal S257 from a CPU which is not shown and outputs the selected signal. This mode indicates an initial adjustment mode at the time when the scanning position detecting sensor is mounted or a normal mode after the completion of the initial adjustment. In other words, with respect to both the photo sensors, the completely same circuits may be arranged for post stage circuits such as a time measuring circuit and a discriminating circuit without providing the selector 255. Note that circuits related to the photo sensor 47 which becomes a reference position are used only in the initial adjustment in which the photo sensor 47 is positioned. Therefore, in the normal mode after the position of the photo sensor 47 is determined, the selector 255 is switched in accordance with the mode signal S257 so that the amplified signal S256 is inputted to a time measuring circuit 256 of a post stage. The time measuring circuit 256 measures a pulse width of the inputted amplified signal S256 based on a clock S258 and outputs a measurement result S262 to a discriminating circuit 257. The discriminating circuit 257 compares the measurement result S262 with predetermined pulse widths S259 and S260 and adjusts the scanning line of LD2.

Figure 13A:
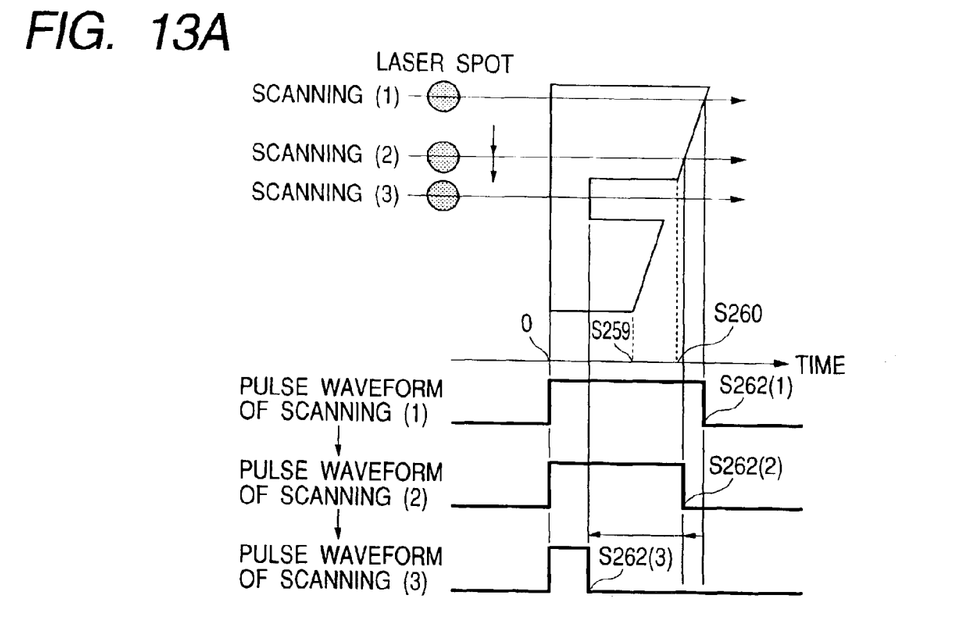
FIGS. 13A and 13B show waveforms in main blocks of the scanning position detecting circuit of the present invention.
Figure 13B:
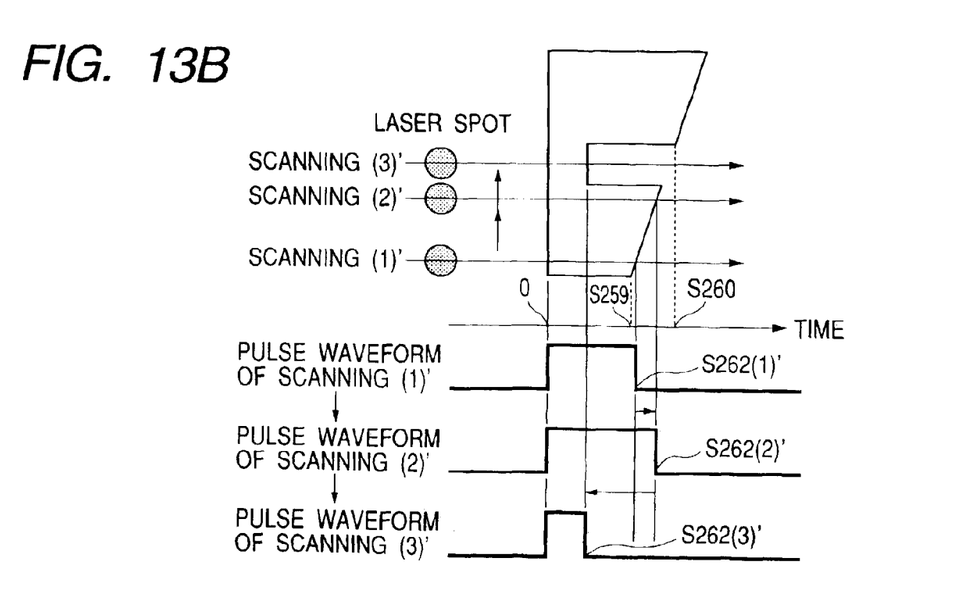

This operation will be described with reference to FIGS. 13A and 13B. When the measurement result S262 inputted to the discriminating circuit 257 is related to scanning (1) shown in FIG. 13A, the discriminating circuit 257 determines S262(1)>S260, and outputs to a CPU which is not shown a control signal S261 for operating the scanning line of LD2 in a direction apart from LD1 (down direction in FIG. 13A). Even if the measurement result S262 is related to scanning (2) at next determination, S262(2)>S260 is determined and the scanning line of LD2 is operated in the direction apart from LD1. When S262(3)<S259 is satisfied, the discriminating circuit 257 outputs a stop signal S261 to the CPU which is not shown and ends the adjustment. In addition, when the measurement result S262 inputted to the discriminating circuit 257 is related to scanning (1)' shown in FIG. 13B, the discriminating circuit 257 determines S259<S262(1)'<S260 and outputs to the CPU which is not shown a control signal S261 for operating the scanning line of LD2 in a direction approaching LD1 (up direction in FIG. 13B). Even if the measurement result S262 is related to scanning (2)' at next determination, S259<S262(2)'<S260 is determined and the scanning line of LD2 is operated in the direction approaching LD1. When S262(3)'<S259 is satisfied, the discriminating circuit 257 outputs a stop signal S261 to the CPU which is not shown and ends the adjustment. Those operations are controlled as in the case where the position of the scanning line of LD1 is adjusted as the initial adjustment mode.

Figure 14:
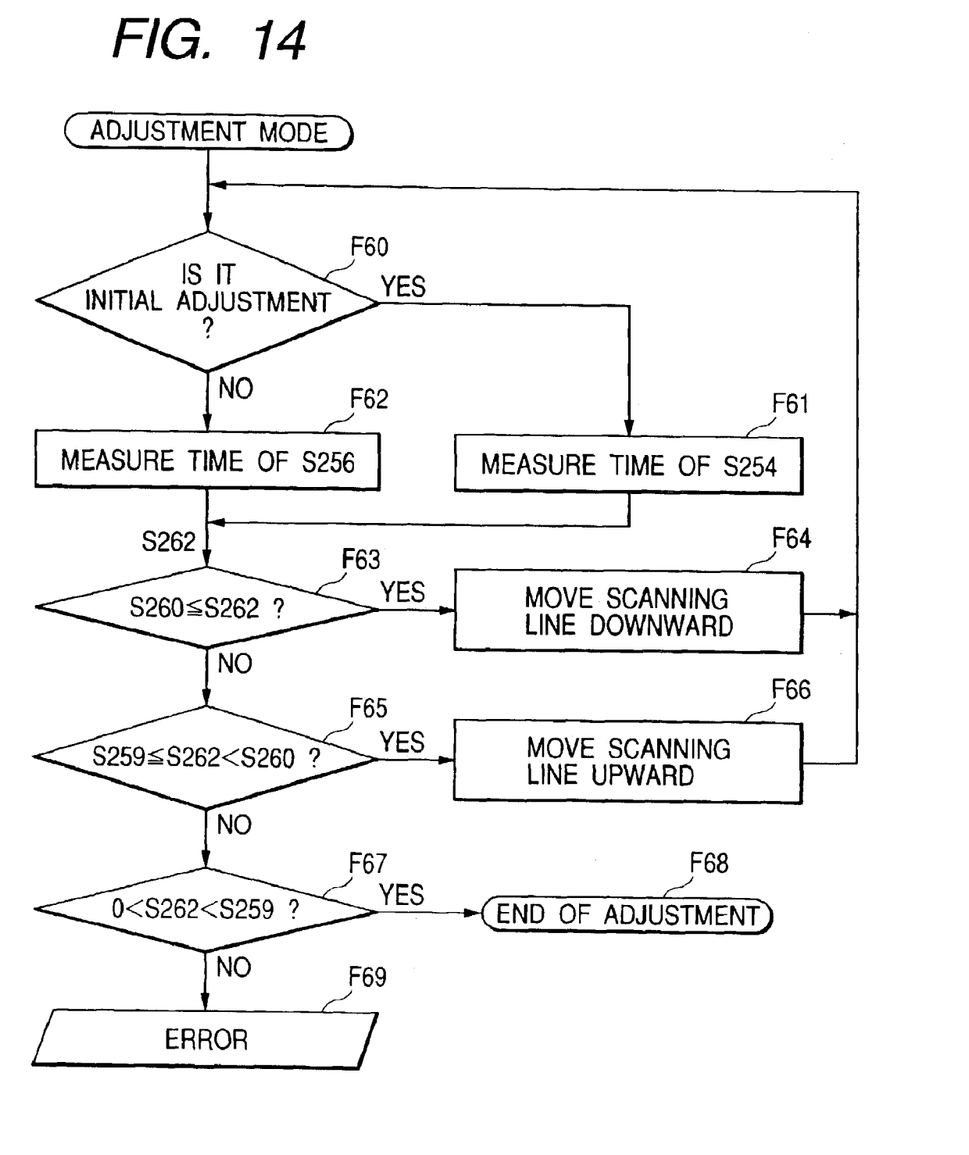
FIG. 14 is a flow chart in the scanning position detecting circuit of the present invention.

FIG. 14 is a flow chart showing a series of those operations. In FIG. 14, when an adjustment mode is started, first, the CPU which is not shown determines whether or not the mode is an initial adjustment mode (F60). When it is the initial adjustment mode, the amplified signal S254 is selected in order to measure an output signal from the photo sensor 47 and a time corresponding to a pulse width thereof is measured (F61). Alternatively, when it is not the initial adjustment mode but a normal mode, the amplified signal S256 is selected in order to measure an output signal from the photo sensor 48 and a time corresponding to a pulse width thereof is measured (F62). When the measurement result S262 is equal to or longer than S260 (F63), a current scanning line is moved downward by a predetermined amount of movement (F64) and processing is returned to the adjustment mode (F60). When S262 is shorter than S260, processing goes to next determination (F65). In F65, it is determined whether or not S259≦S262<S260 is satisfied. If Yes in F65, the current scanning line is moved upward by a predetermined amount of movement (F66) and processing is returned to the adjustment mode (F60). If No in F65, processing goes to next determination (F67). In F67, it is determined whether or not S262 is shorter than S259. If shorter, the adjustment is ended (F68). Note that, when S262 is 0, laser light is not detected by the photo sensor, so that processing goes to error processing (F69).

With respect to the above-mentioned contents, in the case of the structure of three sensors which is described in the embodiment as shown in FIG. 7C, a set of circuits may be added in the front of the selector without modifying the circuits located in the rear of the selector. In addition, in the case of the sensor structure having the plurality of recesses which is described in another embodiment as shown in FIG. 9, the number of pulse widths used for comparison in the discriminating circuit has only to be increased. Thus, applications are easily possible.

What is claimed is:

1. An optical scanning apparatus comprising:
    a semiconductor laser for emitting a multi-beam for forming a latent image on an image bearing member; and
    a plurality of light receiving portions for receiving the multi-beam, the number of light receiving portions being equal to or larger than the number of beams of the multi-beam,
    wherein the plurality of light receiving portions are arranged with a predetermined space between them in a sub-scanning direction of the multi-beam without being overlapped with each other, and each of the plurality of light receiving portions has a shape so that edges of the plurality of light receiving portions on a start side in a main scanning direction are in parallel to each other, edges of the plurality of light receiving portions on an end side in the main scanning direction are in parallel to each other, and the edges on the start side and the edges on the end side in the main scanning direction are not in parallel to each other.

2. An optical scanning apparatus according to claim 1, wherein the predetermined space is a desirable pitch between scanning positions of the multi-beam.

3. An optical scanning apparatus according to claim 2, wherein the semiconductor laser is composed of a plurality of semiconductor laser units.

4. An optical scanning apparatus according to claim 3, wherein the plurality of light receiving portions include at least a first light receiving portion for receiving a first beam as a reference and a second light receiving portion for receiving a second beam, and a displacement of position in the sub-scanning direction is detected based on a signal obtained by entering the first beam and the second beam into the plurality of light receiving portions.

5. An optical scanning apparatus according to claim 4, further comprising a beam pitch control section which determines that a space between the scanning positions of the multi-beam is the desirable pitch when a length in which the first beam as the reference scans on the first light receiving portion is equal to a length in which the second beam scans on the second light receiving portion.

6. An optical scanning apparatus according to claim 3, wherein the plurality of light receiving portions include a first light receiving portion for receiving a laser beam emitted from a first semiconductor laser unit and a second light receiving portion for receiving a laser beam emitted from a second semiconductor laser unit,
    wherein said optical scanning apparatus further comprising:
    a first current-voltage converting section for converting a current signal obtained from the first light receiving portion to a voltage signal; and
    a second current-voltage converting section for converting a current signal obtained from the second light receiving portion to a voltage signal, and
    wherein a space between a scanning position of the first semiconductor laser unit and a scanning position of the second semiconductor laser unit is measured based on a comparison result between an output signal of the first current-voltage converting section and an output signal of the second current-voltage converting section.

7. An optical scanning apparatus comprising:
    a semiconductor laser for emitting a multi-beam for forming a latent image on an image bearing member; and a plurality of light receiving portions for receiving the multi-beam, the number of light receiving portions being equal to or larger than the number of beams of the multi-beam, wherein the plurality of light receiving portions are arranged with a predetermined space between them in a sub-scanning direction of the multi-beam without being overlapped with each other, each of the plurality of light receiving portions has a shape so that edges of the plurality of light receiving portions on a start side in a main scanning direction are in parallel to each other, edges of the plurality of light receiving portions on an end side in the main scanning direction are in parallel to each other, and the edges on the start side and the edges on the end side in the main scanning direction are not in parallel to each other, and the edges on one of the start side and the end side in the main scanning direction is substantially perpendicular to the main scanning direction, and at least one recess is provided in each of the edges on the other of the start side and the end side.

8. An optical scanning apparatus according to claim 7, wherein in the case in which the shape of each of the plurality of light receiving portions has two sides parallel to the main scanning direction, when a length of a maximum side of the two parallel sides is given by "a", a length of a minimum side of the two parallel sides is given by "b", and a length of a remaining portion due to the recess of each of the plurality of light receiving portions is given by "c", the following relationship is satisfied:

c<b<a.

9. An optical scanning apparatus according to claim 7, wherein when a plurality of recesses are provided in each of the plurality of light receiving portions, lengths of remaining portions due to the plurality of recesses of each of the plurality of light receiving portions are different from each other.

10. An optical scanning apparatus according to claim 8, wherein a width of the recess in each of the plurality of light receiving portions in the sub-scanning direction is equal to or larger than a spot diameter of the multi-beam in a direction substantially perpendicular to the main scanning direction.

11. An optical scanning apparatus according to claim 7, wherein each of the plurality of light receiving portions is of a heptagonal or more polygonal shape having the recess.

12. An optical scanning apparatus according to claim 7, wherein each of the plurality of light receiving portions is of a triangular or rectangular shape and the recess is formed by masking a part of each of the plurality of light receiving portions.

13. An optical scanning apparatus according to claim 10, wherein when respective scanning lines of the multi-beam pass through predetermined positions of the plurality of light receiving portions, corresponding consistent signals are outputted.

14. An optical scanning apparatus according to claim 7, wherein the predetermined space corresponds to a resolution of the optical scanning apparatus in the sub-scanning direction.

15. An optical scanning apparatus according to claim 14, wherein when the resolution of the optical scanning apparatus in the sub-scanning direction is changeable, the predetermined space corresponds to the resolution changeable by the optical scanning apparatus.

16. An optical scanning apparatus according to claim 13, wherein when a pulse width of a detection signal from each of the plurality of light receiving portions is equal to or shorter than a predetermined pulse width, a corresponding consistent signal is outputted.

17. An optical scanning apparatus according to claim 16, wherein it is controlled such that the consistent signals from the plurality of light receiving portions, resulting from the scanning lines of the multi-beam are outputted from respective ones of the plurality of light receiving portions, thereby adjusting a beam space of the multi-beam in the sub-scanning direction.

* * * * *